United States Patent
Kuo

(10) Patent No.: US 11,388,497 B1
(45) Date of Patent: Jul. 12, 2022

(54) MICROPHONE HOLDER WITH ADJUSTABLE CLAMPING SPACING

(71) Applicant: Ying-Tsung Kuo, Tainan (TW)

(72) Inventor: Ying-Tsung Kuo, Tainan (TW)

(*) Notice: Subject to any disclaimer, the term of this patent is extended or adjusted under 35 U.S.C. 154(b) by 0 days.

(21) Appl. No.: 17/183,575

(22) Filed: Feb. 24, 2021

(51) Int. Cl.
*H04R 1/08* (2006.01)
*F16M 11/00* (2006.01)
*B25B 5/00* (2006.01)
*F16M 11/04* (2006.01)

(52) U.S. Cl.
CPC ............... *H04R 1/08* (2013.01); *B25B 5/006* (2013.01); *F16M 11/04* (2013.01)

(58) Field of Classification Search
CPC ... H04R 1/00; H04R 1/02; H04R 1/08; H04R 1/28; H04R 1/2892; H04R 1/14; H04R 1/028; H04R 1/083; F16F 11/00; F16F 11/02; F16F 11/04; F16F 11/06; F16F 11/16; F16F 11/24; F16F 11/28; F16F 11/32; F16F 11/34; B25B 5/00; B25B 5/006; B25B 5/06; B25B 5/16; B25B 5/163
See application file for complete search history.

(56) References Cited

U.S. PATENT DOCUMENTS

| | | | | |
|---|---|---|---|---|
| 6,007,032 | A * | 12/1999 | Kuo | F16M 11/10 248/125.1 |
| 6,412,737 | B1 * | 7/2002 | Minagawa | F16B 7/14 248/125.8 |
| 6,922,475 | B2 | 7/2005 | Hsieh | |
| 2008/0061195 | A1 * | 3/2008 | Carnevali | F16M 13/02 248/125.8 |
| 2011/0168867 | A1 * | 7/2011 | Hennessey | H04R 1/02 248/636 |
| 2016/0053934 | A1 * | 2/2016 | Hennessey | A47B 19/002 248/124.2 |
| 2017/0347170 | A1 * | 11/2017 | Liao | F16M 11/2021 |
| 2018/0160221 | A1 * | 6/2018 | Frenchik, Jr. | H04R 1/08 |
| 2019/0160632 | A1 * | 5/2019 | Chang | B25B 5/062 |

FOREIGN PATENT DOCUMENTS

| | | | | |
|---|---|---|---|---|
| CN | 208836369 U | * | 5/2019 | H04R 1/08 |
| CN | 209897226 U | * | 1/2020 | H04R 1/08 |

* cited by examiner

*Primary Examiner* — Thang V Tran
(74) *Attorney, Agent, or Firm* — Karin L. Williams; Alan D. Kamrath; Mayer & Williams PC

(57) ABSTRACT

A microphone holder includes a coupling seat and a holding seat having a lower end coupled to the coupling seat. The holding seat includes an adjusting portion above the lower end of the holding seat and a clamping portion located above the adjusting portion. A longitudinal groove extends from a top end of the adjusting portion and is defined by first and second actuating portions having first and second inclined guiding portions, respectively. The clamping portion includes first and second clamping pieces having lower ends connected to the first and second actuating portions, respectively. A clamping groove is defined between the first and second clamping pieces. An adjusting ring is disposed around the adjusting portion and includes a longitudinal hole. An upper end of the inner periphery of the longitudinal hole includes an abutting portion configured to abut against the first and second inclined guiding faces.

9 Claims, 6 Drawing Sheets

MICROPHONE HOLDER WITH ADJUSTABLE CLAMPING SPACING

BACKGROUND OF THE INVENTION

The present invention relates to a microphone holder and, more particularly, to a microphone holder with an adjustable clamping spacing for increasing application of the microphone.

A microphone is generally securely mounted on a microphone holder that can be placed on a stand with an adjustable height. FIG. 6 shows a conventional microphone holder including a coupling seat 1' and a holding seat 2'. The coupling seat 1' includes a lower end having a coupling portion 11' for coupling with a stand. The coupling seat 1' further includes an upper end having an upper assembling portion 12'. The holding seat 2' includes a lower end having a lower assembling portion 21' pivotably connected to the upper assembling portion 12'. The holding seat 2' further includes a substantially U-shaped clamping portion 22' comprised of two lateral clamping pieces 221' and 222' and having an upper opening 223' and a central clamping groove 224'. A handgrip of a microphone can be held in the central clamping groove 224' and can be clamped by the two lateral clamping pieces 221' and 222'.

After the coupling seat 1' and the holding seat 2' are assembled, the upper and lower assembling portions 12' and 21' permit adjustment of an angular position of the holding seat 2'. However, microphones have various sizes. For example, a handgrip of a wireless microphone has a diameter larger than that of a wired microphone, such that the microphone holder having a fixed clamping groove can only hold microphones of a corresponding diameter, providing poor application. U.S. Pat. No. 6,922,475 discloses a shockproof strip between a retaining base and a holder to provide a shockproof effect. However, the hollow of the holder for holding a microphone has a fixed size and, thus, can only receive microphones of a specific size, providing poor application.

BRIEF SUMMARY OF THE INVENTION

An objective of the present invention is to provide a microphone holder for holding microphone handgrips of various diameters.

A microphone holder with an adjustable clamping spacing according to the present invention comprises a coupling seat and a holding seat made of flexible, deformable, and shape-restorable material. The holding seat includes a lower end having an upper assembling portion assembled with the coupling seat. The holding seat further includes an adjusting portion located above and connected to the upper assembling portion. A clamping portion is located above and connected to the adjusting portion. The adjusting portion includes a central portion having a longitudinal groove extending downwards from a top end thereof. The longitudinal groove is defined by a first actuating portion and a second actuating portion located on two sides of the longitudinal groove. The first actuating portion includes a first inclined guiding face that tapers downwards towards a central portion of the adjusting portion. The second actuating portion includes a second inclined guiding face that tapers downwards towards a central portion of the adjusting portion. The clamping portion includes first and second clamping pieces having lower ends connected to the first and second actuating portions, respectively. A clamping groove is defined between the first and second clamping pieces. An adjusting ring is disposed around the adjusting portion of the holding seat. The adjusting ring is displaceable in a vertical direction relative to the adjusting portion. The adjusting ring includes a central portion including a longitudinal hole having an inner periphery. An upper end of the inner periphery of the longitudinal hole includes an abutting portion configured to abut against the first and second inclined guiding faces. A vertical position of the adjusting ring relative to the adjusting portion of the holding seat is adjustable to adjust a width of the clamping groove.

In an example, the adjusting portion includes a lower end having an outer periphery with a first threaded portion. The inner periphery of the longitudinal hole of the adjusting ring includes a second threaded portion in threading connection with the first threaded portion.

In an example, the first actuating portion of the holding seat includes a top end having a first stopper portion extending beyond the longitudinal hole of the adjusting ring and located above the first inclined guiding face. The second actuating portion of the holding seat includes a top end having a second stopper portion extending beyond the longitudinal hole of the adjusting ring and located above the second inclined guiding face.

In an example, the first inclined guiding face includes a lower end having a first transverse groove extending from an outer side towards a central portion of the adjusting portion. The second inclined guiding face includes a lower end having a second transverse groove extending from the outer side towards the central portion of the adjusting portion. The first transverse groove includes a first wider portion adjacent to the central portion of the adjusting portion and having a width larger than a width of an outer end of the first transverse groove adjacent to the outer side of the adjusting portion. The second transverse groove includes a second wider portion adjacent to the central portion of the adjusting portion and having a width larger than a width of an outer end of the second transverse groove adjacent to the outer side of the adjusting portion.

When the adjusting ring is in a lower position relative to the adjusting portion, the abutting portion is aligned with bottom ends of the first and second inclined guiding faces. The longitudinal groove has a larger width, such that the clamping groove between the first and second clamping pieces has a larger width. The adjusting ring can be rotated to move upwardly. The abutting portion can abut against the first and second inclined guiding faces, such that the first and second actuating portions flex toward each other to gradually reduce the width of the longitudinal groove. Thus, the spacing between the first and second clamping pieces can be reduced to reduce the width of the clamping groove. The adjustment is easy. As a result, the clamping spacing of the clamping portion of the microphone holder according to the present invention can be varied according to various sizes of handgrips of different microphones, providing wider application.

The present invention will become clearer in light of the following detailed description of illustrative embodiments of this invention described in connection with the drawings.

DETAILED DESCRIPTION OF THE INVENTION

Figure 1:
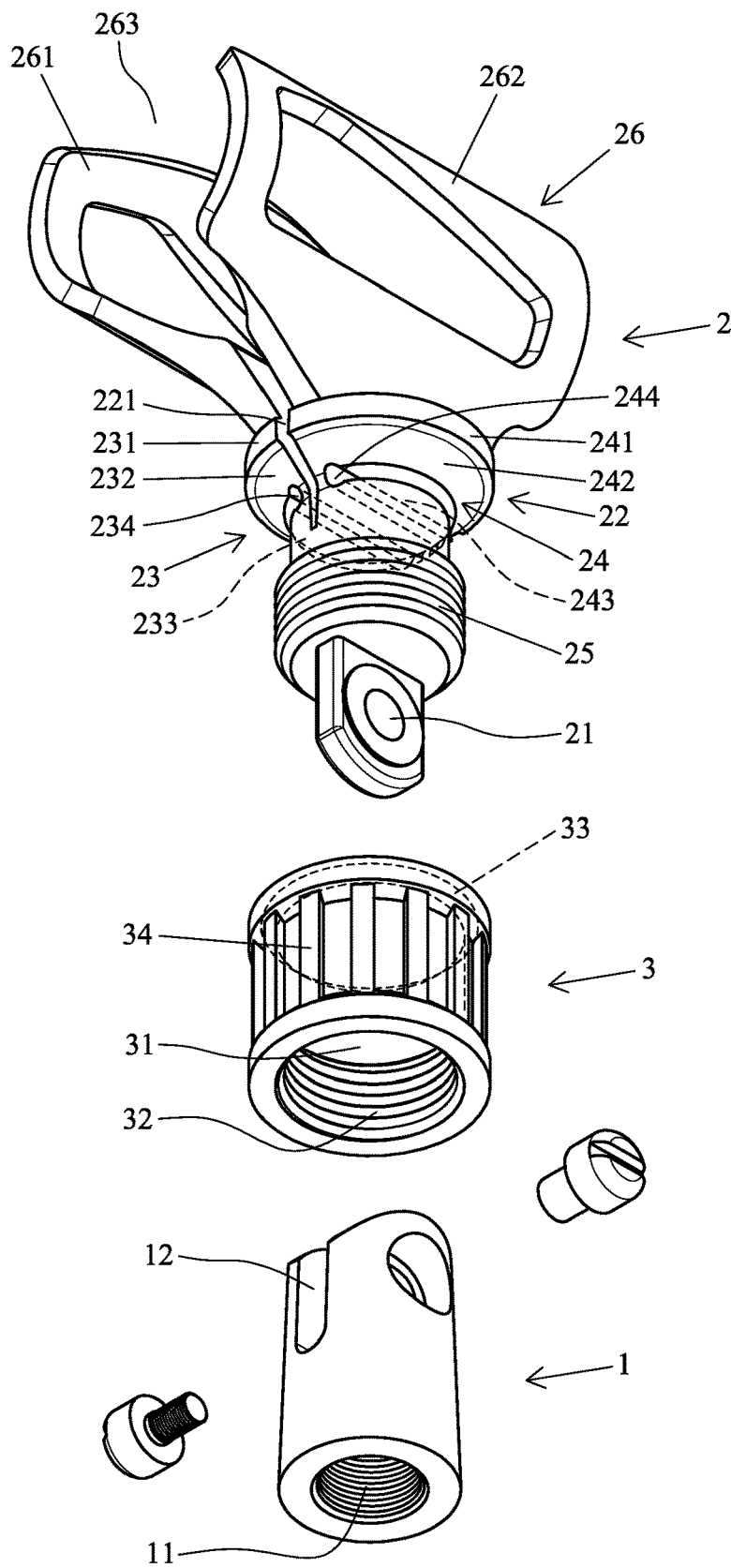
FIG. 1 is an exploded, perspective view of a microphone holder of an embodiment according to the present invention.
Figure 2:
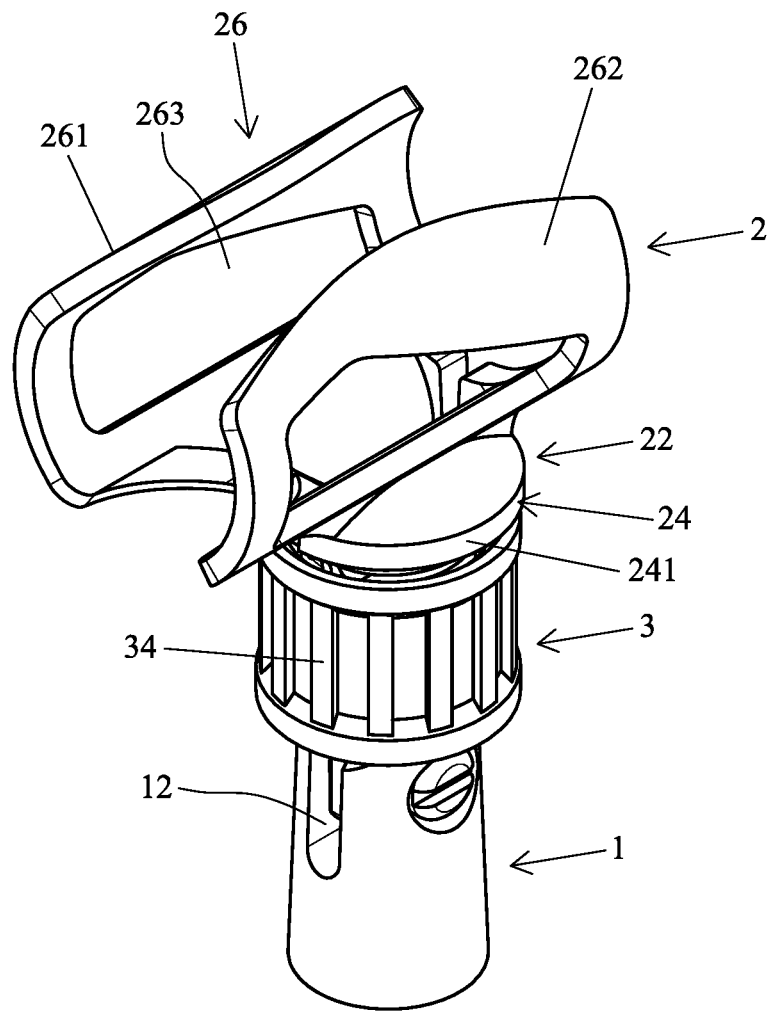
FIG. 2 is a perspective view of the microphone holder of FIG. 1 after assembly.

With reference to FIGS. 1-4, a microphone holder with an adjustable clamping spacing of an embodiment according to the present invention comprises a coupling seat 1, a holding seat 2, and an adjusting ring 3. The coupling seat 1 includes a lower end having a coupling portion 11 for coupling with a microphone stand 5. The coupling seat 1 further includes an upper end having a lower assembling portion 12

The holding seat 2 is made of flexible, deformable, and shape-restorable material. The holding seat 2 includes a lower end having an upper assembling portion 21 pivotably connected to the upper assembling portion 12 of the coupling seat 1. The holding seat 2 further includes an adjusting portion 22 located above and connected to the upper assembling portion 21. The adjusting portion 22 includes substantially circular cross sections. A clamping portion 26 is located above and connected to the adjusting portion 22. The adjusting portion 22 includes a central portion having a longitudinal groove 221 extending downwards from a top end thereof. The longitudinal groove 221 is defined by a first actuating portion 23 and a second actuating portion 24 located on two sides of the longitudinal groove 221. The first actuating portion 23 of the holding seat 2 includes a top end having a first stopper portion 231 extending outwards. The second actuating portion 24 of the holding seat 2 includes a top end having a second stopper portion 241 extending outwards.

The first actuating portion 23 includes a first inclined guiding face 232 located below the first stopper portion 231 and tapering downwards towards a central portion of the adjusting portion 22. The second actuating portion 24 includes a second inclined guiding face 242 located below the second stopper portion 241 and tapering downwards towards a central portion of the adjusting portion 22. The first inclined guiding face 232 includes a lower end having a first transverse groove 233 extending from an outer side towards a central portion of the adjusting portion 22. The second inclined guiding face 242 includes a lower end having a second transverse groove 243 extending from the outer side towards the central portion of the adjusting portion 22. The first transverse groove 233 includes a first wider portion 234 adjacent to the central portion of the adjusting portion 22 and having a width larger than a width of an outer end of the first transverse groove 233 adjacent to the outer side of the adjusting portion 22. The second transverse groove 243 includes a second wider portion 244 adjacent to the central portion of the adjusting portion 22 and having a width larger than a width of an outer end of the second transverse groove 243 adjacent to the outer side of the adjusting portion 22.

The adjusting portion 22 includes a lower end having an outer periphery with a first threaded portion 25. The clamping portion 26 includes first and second clamping pieces 261 and 262 which have upper arcuate portions. Lower ends of the first and second clamping pieces 261 and 262 are connected to the first and second actuating portions 23 and 24, respectively. A clamping groove 263 is defined between the first and second clamping pieces 261 and 262.

The adjusting ring 3 is disposed around the adjusting portion 22 of the holding seat 2. Each of the first and second stopper portions 231 and 241 has an outer edge extending beyond the longitudinal hole 31. The longitudinal hole 31 of the adjusting ring 3 includes an inner periphery having a second threaded portion 32 in threading connection with the first threaded portion 25. An upper end of the inner periphery of the longitudinal hole 31 includes an abutting portion 33 configured to abut against the first and second inclined guiding faces 232 and 242. The abutting portion 33 has a slope corresponding to a slope of each of the first and second inclined guiding faces 232 and 244. The adjusting ring 3 includes an outer periphery having a plurality of anti-slip protrusions 34.

Figure 3:
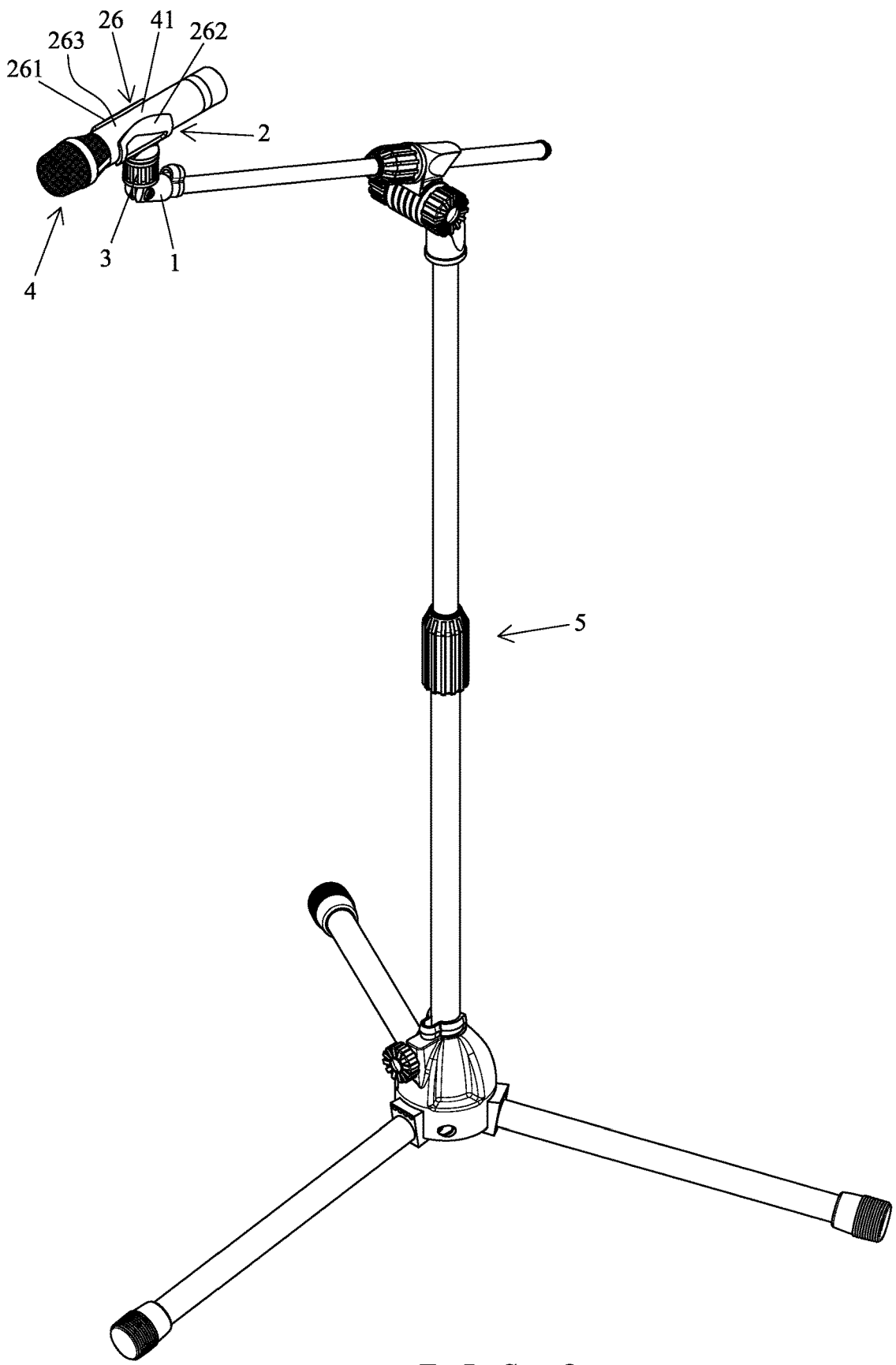
FIG. 3 is a perspective view illustrating disposition of the microphone holder on a microphone stand.
Figure 4:
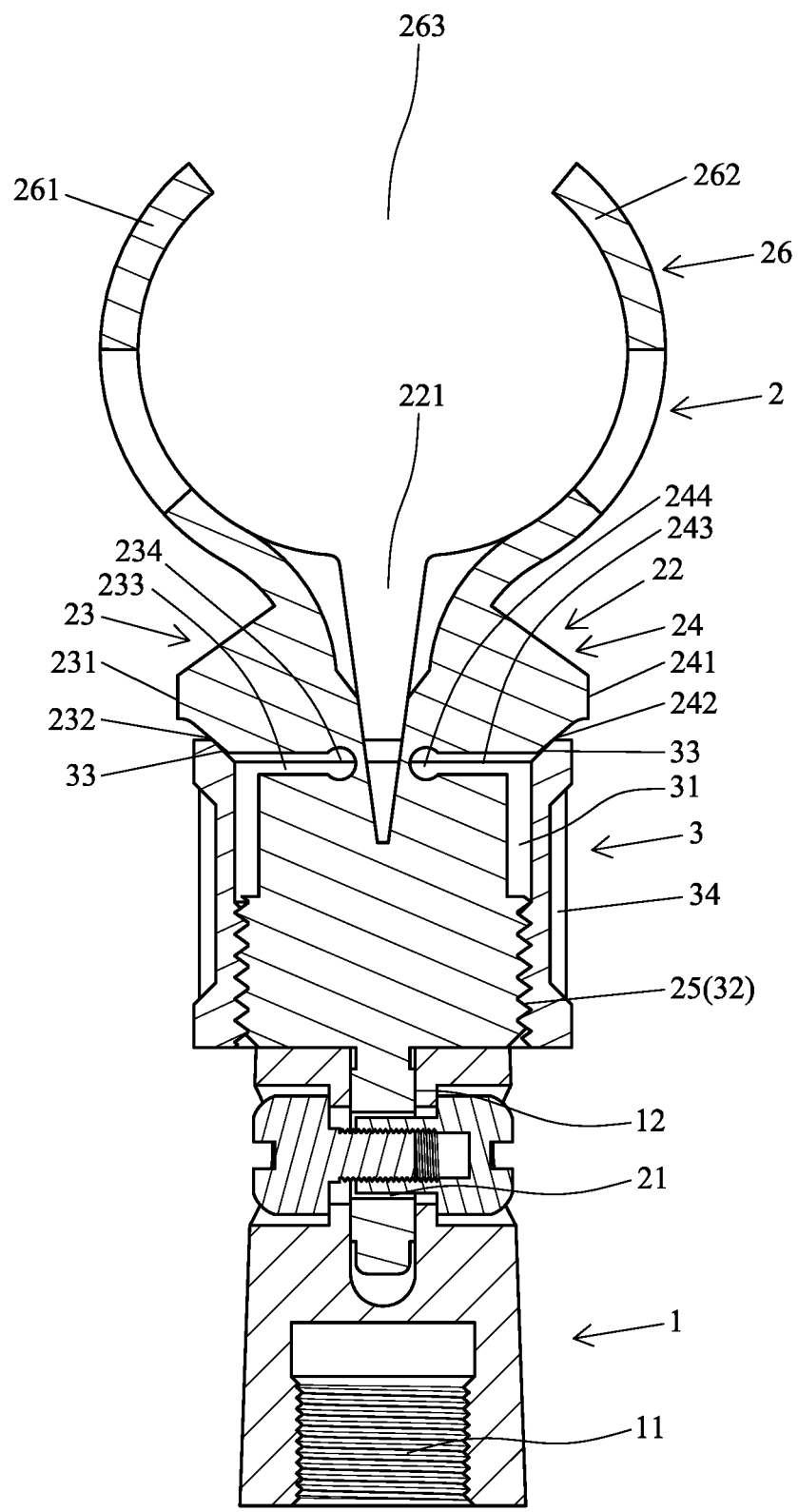
FIG. 4 is a cross sectional view of the microphone holder with a larger clamping spacing.

With reference to FIGS. 3 and 4, the coupling seat 1 can be coupled to the microphone stand 5 by the coupling portion 11. The second threaded portion 32 of the adjusting ring 3 is threadedly coupled to the first threaded portion 25 of the holding seat 2. When the adjusting ring 3 is in a lower position relative to the adjusting portion 22, the abutting portion 33 is aligned with bottom ends of the first and second inclined guiding faces 232 and 242. The longitudinal groove 221 has a larger width, such that the clamping groove 263 between the first and second clamping pieces 261 and 262 has a larger width.

Figure 5:
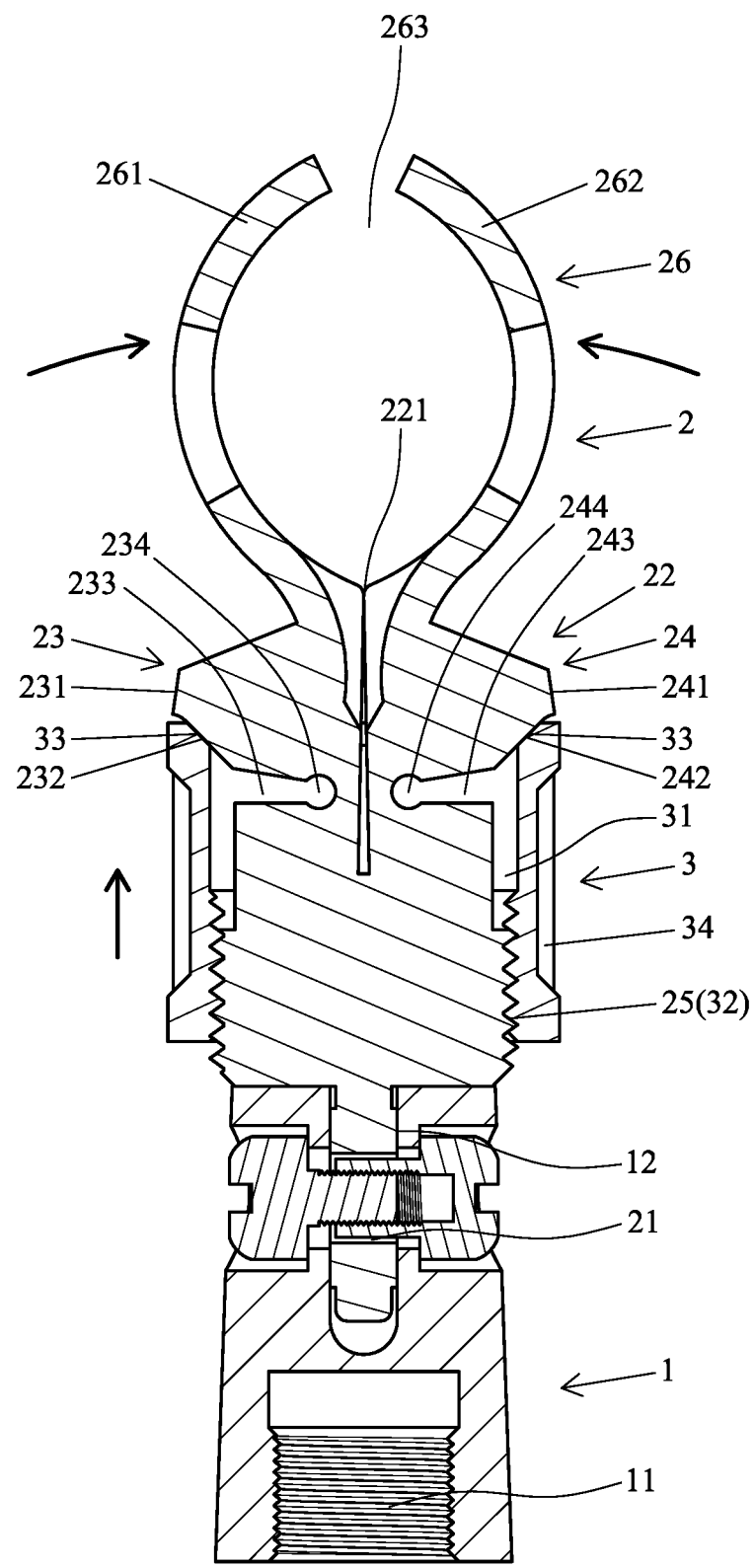
FIG. 5 is a cross sectional view of the microphone holder with a smaller clamping spacing.
Figure 6:
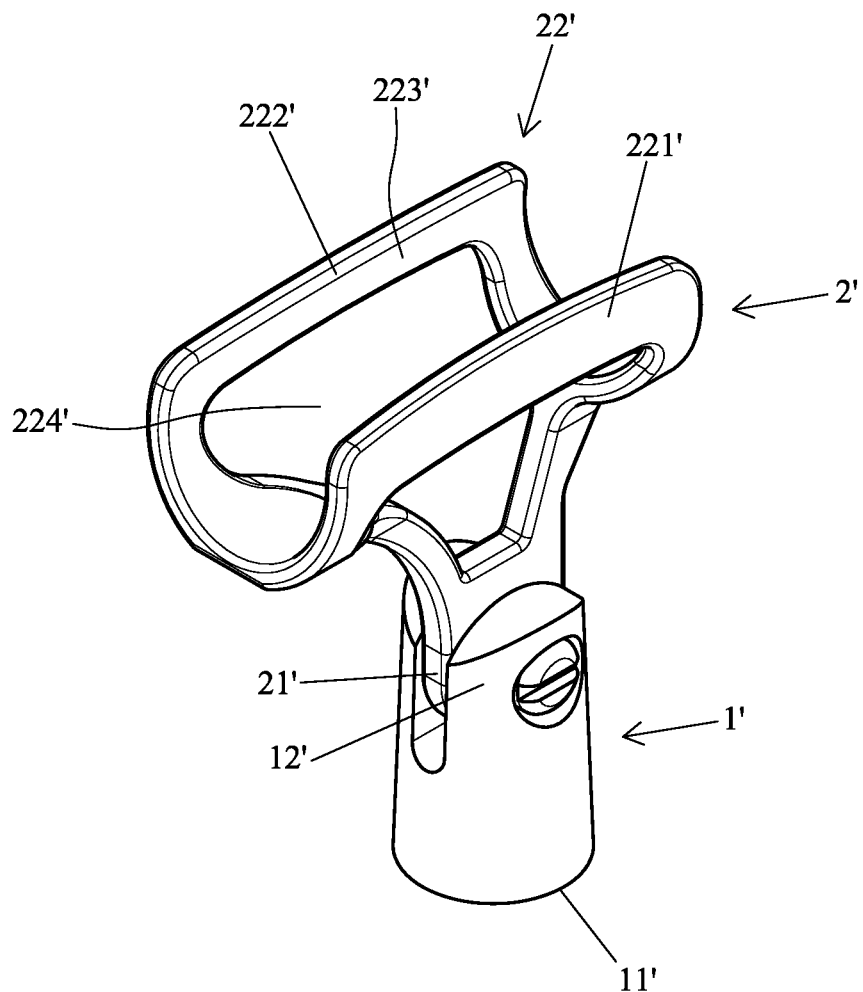
FIG. 6 is a perspective view of a conventional microphone holder.

With reference to FIGS. 3 and 5, the adjusting ring 3 can be rotated to move upwardly. The abutting portion 33 can abut against the first and second inclined guiding faces 232 and 242, such that the first and second actuating portions 23 and 24 flex toward each other to gradually reduce the width of the longitudinal groove 221. Thus, the spacing between the first and second clamping pieces 261 and 262 can be reduced to reduce the width of the clamping groove 263. When desired, the adjusting ring 3 can be rotated to move downwardly, such that the width of the longitudinal groove 221 increases under the returning force of the holding seat 2. The spacing between the first and second clamping pieces 261 and 262 and the width of the clamping groove 263 are increased. The adjustment is easy. As a result, the clamping spacing of the clamping portion 26 of the microphone holder according to the present invention can be varied according to various sizes of handgrips 41 of different microphones 4, providing wider application.

In adjustment, the first and second transverse grooves 233 and 243 permit easier movement of the first and second actuating portions 23 and 24. Furthermore, the first and second wider portions 234 and 244 permit easier deformation of the first and second transverse grooves 233 and 243. The adjusting convenience is further improved.

In view of the above, the operation of the microphone holder according to the present invention is easy to provide wider application. The adjusting ring 3 can be moved vertically relative to the holding seat 2 by providing proper tightness therebetween or other mechanism to control the width of the clamping groove 263.

Although specific embodiments have been illustrated and described, numerous modifications and variations are still possible without departing from the scope of the invention. The scope of the invention is limited by the accompanying claims.

The invention claimed is:

1. A microphone holder with an adjustable clamping spacing comprising:
   a coupling seat;
   a holding seat made of flexible, deformable, and shape-restorable material, wherein the holding seat includes a lower end having an upper assembling portion assembled with the coupling seat, wherein the holding seat further includes an adjusting portion located above and connected to the upper assembling portion, wherein a clamping portion is located above and connected to the adjusting portion, wherein the adjusting portion includes a central portion having a longitudinal groove extending downwards from a top end thereof, wherein a clamping groove is defined by a first actuating portion and a second actuating portion located on two sides of the clamping groove, wherein the first actuating portion includes a first inclined guiding face that tapers downwards towards a central portion of the adjusting portion, wherein the second actuating portion includes a second inclined guiding face that tapers downwards towards a central portion of the adjusting portion, wherein the clamping portion includes first and second clamping pieces having lower ends connected to the first and second actuating portions, respectively, and wherein the clamping groove is defined between the first and second clamping pieces; and an adjusting ring disposed around the adjusting portion of the holding seat, wherein the adjusting ring is displaceable in a vertical direction relative to the adjusting portion, wherein the adjusting ring includes a central portion including a longitudinal hole having an inner periphery, wherein an upper end of the inner periphery of the longitudinal hole includes an abutting portion configured to abut against the first and second inclined guiding faces, and wherein a vertical position of the adjusting ring relative to the adjusting portion of the holding seat is adjustable to adjust a width of the clamping groove.

2. The microphone holder with the adjustable clamping spacing as claimed in claim 1, wherein the adjusting portion includes a lower end having an outer periphery with a first threaded portion, and wherein the inner periphery of the longitudinal hole of the adjusting ring includes a second threaded portion in threading connection with the first threaded portion.

3. The microphone holder with the adjustable clamping spacing as claimed in claim 1, wherein the first actuating portion of the holding seat includes a top end having a first stopper portion extending beyond the longitudinal hole of the adjusting ring and located above the first inclined guiding face, and wherein the second actuating portion of the holding seat includes a top end having a second stopper portion extending beyond the longitudinal hole of the adjusting ring and located above the second inclined guiding face.

4. The microphone holder with the adjustable clamping spacing as claimed in claim 1, wherein the first inclined guiding face includes a lower end having a first transverse groove extending from an outer side towards a central portion of the adjusting portion, and wherein the second inclined guiding face includes a lower end having a second transverse groove extending from the outer side towards the central portion of the adjusting portion.

5. The microphone holder with the adjustable clamping spacing as claimed in claim 4, wherein the first transverse groove includes a first wider portion adjacent to the central portion of the adjusting portion and having a width larger than a width of an outer end of the first transverse groove adjacent to the outer side of the adjusting portion, and wherein the second transverse groove includes a second wider portion adjacent to the central portion of the adjusting portion and having a width larger than a width of an outer end of the second transverse groove adjacent to the outer side of the adjusting portion.

6. The microphone holder with the adjustable clamping spacing as claimed in claim 1, wherein the abutting portion has a slope corresponding to a slope of each of the first and second inclined guiding faces.

7. The microphone holder with the adjustable clamping spacing as claimed in claim 1, wherein the adjusting ring includes an outer periphery having a plurality of anti-slip protrusions.

8. The microphone holder with the adjustable clamping spacing as claimed in claim 1, wherein the adjusting portion of the holding seat includes substantially circular cross sections.

9. The microphone holder with the adjustable clamping spacing as claimed in claim 1, wherein the coupling seat includes a lower end having a coupling portion and an upper end having a lower assembling portion, and wherein the upper assembling portion of the holding seat is pivotably connected to the lower assembling portion.

\* \* \* \* \*